United States Patent
Li et al.

(10) Patent No.: US 8,631,182 B2
(45) Date of Patent: Jan. 14, 2014

(54) WAKE-UP SIGNAL TEST SYSTEM HAVING A TEST CARD FOR TESTING WAKE-UP SIGNAL OUTPUT BY A PLATFORM CONTROLLER HUB OF A MOTHERBOARD

(75) Inventors: Hui Li, Shenzhen (CN); Yu-Mei Li, Shenzhen (CN); Hao Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 131 days.

(21) Appl. No.: 13/169,475

(22) Filed: Jun. 27, 2011

(65) Prior Publication Data
US 2012/0311384 A1    Dec. 6, 2012

(30) Foreign Application Priority Data
May 30, 2011    (CN) .......................... 2011 1 0141132

(51) Int. Cl.
*H05K 7/10*        (2006.01)
*G06F 13/40*       (2006.01)
(52) U.S. Cl.
CPC .................................. *G06F 13/409* (2013.01)
USPC ....................................................... 710/301

(58) Field of Classification Search
USPC ........................... 710/300–315, 62–64, 8–19; 713/300–340
See application file for complete search history.

(56) References Cited

U.S. PATENT DOCUMENTS

| | | | | |
|---|---|---|---|---|
| 6,425,040 | B1 * | 7/2002 | Dewa et al. ................... | 710/303 |
| 6,438,640 | B1 * | 8/2002 | Miyamoto et al. ............ | 710/303 |
| 6,477,602 | B1 * | 11/2002 | Loison ......................... | 710/301 |
| 6,658,508 | B1 * | 12/2003 | Reiss et al. ................... | 710/100 |
| 7,752,372 | B2 * | 7/2010 | Mussatt et al. ............... | 710/301 |
| 8,312,304 | B2 * | 11/2012 | Kwa et al. .................... | 713/310 |
| 2011/0185370 | A1 * | 7/2011 | Tamir et al. .................. | 719/324 |

* cited by examiner

*Primary Examiner* — Raymond Phan
(74) *Attorney, Agent, or Firm* — Altis Law Group, Inc.

(57) ABSTRACT

A wake-up signal test system to test a wake-up signal output by a platform controller hub (PCH) of a motherboard includes a test card and an oscillograph. The test card includes a board with an edge connector, and a button. The button is connected between a first ground pin and a first wake-up signal pin of the edge connector. When the edge connector is inserted into a peripheral component interconnect express (PCIe) socket of the motherboard, the first ground pin is connected to a second ground pin of the PCIe socket, the first wake-up signal pin is connected to a second wake-up pin of the PCIe socket. When the button is pressed, the first wake-up signal pin is connected to the first ground pin to output a low level signal to the PCH to wake up the motherboard. The oscillograph displays a voltage state of the low level signal.

2 Claims, 2 Drawing Sheets

WAKE-UP SIGNAL TEST SYSTEM HAVING A TEST CARD FOR TESTING WAKE-UP SIGNAL OUTPUT BY A PLATFORM CONTROLLER HUB OF A MOTHERBOARD

BACKGROUND

1. Technical Field

The present disclosure relates to wake-up signal test systems, and particularly, to a wake-up signal test system having a test card.

2. Description of Related Art

When a wake-up signal from a platform controller hub (PCH) of a motherboard is tested, a control device is set to transmit a wake-up instruction to a network card of the motherboard. The network card receives the wake-up instruction and outputs a low level signal to wake up the motherboard. An oscillograph connected to the PCH displays the voltage state of the low level signal. However, before testing the wake-up signal, it is necessary to set the control device, which is inconvenient.

BRIEF DESCRIPTION OF THE DRAWINGS

Many aspects of the present embodiments can be better understood with reference to the following drawings. The components in the drawing are not necessarily drawn to scale, the emphasis instead being placed upon clearly illustrating the principles of the present embodiments. Moreover, in the drawing, all the views are schematic, and like reference numerals designate corresponding parts throughout the several views.

DETAILED DESCRIPTION

The disclosure, including the accompanying drawings in which like references indicate similar elements, is illustrated by way of example and not by way of limitation. It should be noted that references to "an" or "one" embodiment in this disclosure are not necessarily to the same embodiment, and such references mean at least one.

Figure 1:
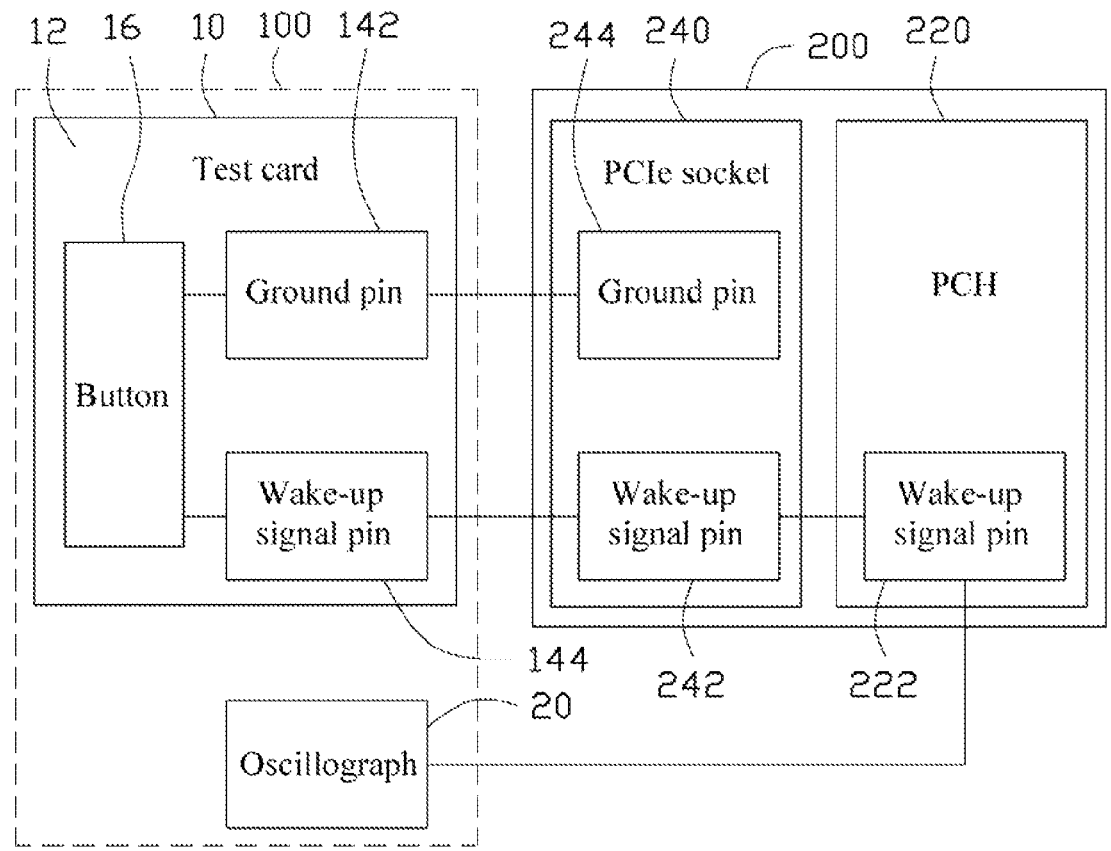
FIG. 1 is a block diagram of an embodiment of a wake-up signal test system, the wake-up signal test system includes a test card.
Figure 2:
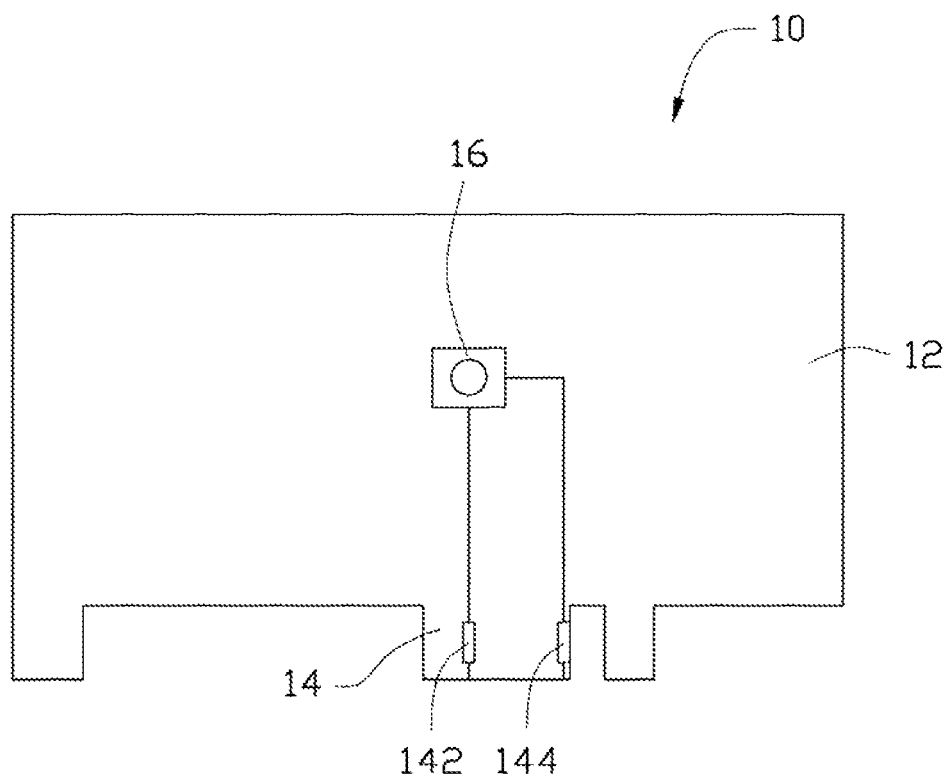
FIG. 2 is a schematic view of the test card of FIG. 1.

Referring to FIGS. 1 and 2, an embodiment of a wake-up signal test system 100 is used to test a wake-up signal output by a platform controller hub (PCH) 220 of a motherboard 200. The wake-up signal test system 100 includes a test card 10 and an oscillograph 20. The test card 10 includes a board 12, an edge connector 14 formed on a side of the board 12, and a button 16 mounted on the board 12. The edge connector 14 is used to be inserted into a peripheral component interconnect express (PCIe) socket 240 of the motherboard 200. The edge connector 14 includes a first ground pin 142 and a first wake-up signal pin 144. The first ground pin 142 is connected to a first terminal of the button 16. The first wake-up signal pin 144 is connected to a second terminal of the button 16. When the button 16 is pressed, the first ground pin 142 is connected to the first wake-up signal pin 144. The oscillograph 20 is connected to a third wake-up signal pin 222 of the PCH 220. The third wake-up signal pin 222 of the PCH 220 is further connected to a second wake-up signal pin 242 of the PCIe socket 240.

In use, the edge connector 14 of the test card 10 is inserted into the PCIe socket 240 of the motherboard 200. The first ground pin 142 of the test card 10 is connected to a second ground pin 244 of the PCIe socket 240. The first wake-up signal pin 144 of the test card 10 is connected to the second wake-up pin 242 of the PCIe socket 240. When the motherboard 200 is in a sleep state and the button 16 is pressed, the first ground pin 142 is connected to the first wake-up signal pin 144. The first wake-up signal pin 144 of the test card 10 outputs a low level signal to the second wake-up signal pin 242 of the PCIe socket 240. The second wake-up signal pin 242 of the PCIe socket 240 outputs a wake-up signal, which is a low level signal to the third wake-up signal pin 222 of the PCH 220 to wake up the motherboard 200, which is in the sleep state. The oscillograph 20 displays a voltage state of the wake-up signal. If the third wake-up signal pin 222 of the PCH 220 of the motherboard 200 is broken, the third wake-up signal pin 222 fails to receive the low level signal. The oscillograph 20 fails to display the voltage state of the low level signal to denote that the third wake-up signal pin 222 of the PCH 220 is broken.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A wake-up signal test system to test a wake-up signal output by a platform controller hub (PCH) of a motherboard, the wake-up signal test system comprising:
   a test card comprising:
      a board comprising an edge connector formed on a side of the board, to be inserted into a peripheral component interconnect express (PCIe) socket connected to the PCH of the motherboard, the edge connector comprising a first ground pin and a first wake-up signal pin; and
      a button mounted on the board, the button comprising a first terminal connected to the first ground pin of the edge connector, and a second terminal connected to the first wake-up signal pin of the edge connector; and
   an oscillograph connected to a second wake-up signal pin of the PCH;
   wherein when the edge connector is inserted into the PCIe socket of the motherboard, the first ground pin is connected to a second ground pin of the PCIe socket, the first wake-up signal pin is connected to a third wake-up pin of the PCIe socket, when the button is pressed, the first wake-up signal pin is connected to the first ground pin to output a low level signal to the PCH to wake up the motherboard, the oscillograph displays a voltage state of the low level signal.

2. A test card to test a wake-up signal output by a platform controller hub (PCH) of a motherboard, the test card comprising:
   a board comprising an edge connector formed on a side of the board, to be insert into a peripheral component interconnect express (PCIe) socket connected to the PCH of the motherboard, the edge connector comprising a first ground pin and a first wake-up signal pin; and
   a button mounted on the board, the button comprising a first terminal connected to the first ground pin of the edge connector, and a second terminal connected to the first wake-up signal pin of the edge connector;
   wherein when the edge connector is inserted into the PCIe socket of the motherboard, the first ground pin is connected to a second ground pin of the PCIe socket, the first wake-up signal pin is connected to a second wake-up pin of the PCIe socket, when the button is pressed, the first wake-up signal pin is connected to the first ground pin to output a low level signal to the PCH to wake up the motherboard.

* * * * *